(12) United States Patent
Yamanoi et al.

(10) Patent No.: US 9,494,423 B2
(45) Date of Patent: Nov. 15, 2016

(54) PHOTOMETRIC APPARATUS AND MEASUREMENT CONTROL PROGRAM

(71) Applicant: KONICA MINOLTA, INC., Chiyoda-ku (JP)

(72) Inventors: Yuta Yamanoi, Toyonaka (JP); Takehiro Yashiro, Hirakata (JP); Kouichi Ishida, Sakai (JP); Keizou Ochi, Nishinomiya (JP); Noriaki Matsubara, Sakai (JP); Satoshi Yokota, Toyonaka (JP)

(73) Assignee: Konica Minolta, Inc., Tokyo (JP)

( * ) Notice: Subject to any disclaimer, the term of this patent is extended or adjusted under 35 U.S.C. 154(b) by 228 days.

(21) Appl. No.: 14/389,335

(22) PCT Filed: Mar. 18, 2013

(86) PCT No.: PCT/JP2013/057657
§ 371 (c)(1),
(2) Date: Sep. 29, 2014

(87) PCT Pub. No.: WO2013/146419
PCT Pub. Date: Oct. 3, 2013

(65) Prior Publication Data
US 2015/0092187 A1    Apr. 2, 2015

(30) Foreign Application Priority Data

Mar. 29, 2012  (JP) ................................. 2012-075952

(51) Int. Cl.
*G01N 21/00* (2006.01)
*G01C 9/06* (2006.01)
*G01J 1/02* (2006.01)
*G01B 21/24* (2006.01)
*G01J 1/42* (2006.01)

(52) U.S. Cl.
CPC .................. *G01C 9/06* (2013.01); *G01B 21/24* (2013.01); *G01J 1/0266* (2013.01); *G01J 1/42* (2013.01); *G01J 2001/4247* (2013.01)

(58) Field of Classification Search
CPC ........... G01C 9/06; G01B 21/24; G01J 1/42; G01J 3/02; G01N 21/64; G01N 21/68
USPC .......................................................... 356/72
See application file for complete search history.

(56) References Cited

U.S. PATENT DOCUMENTS

| | | | |
|---|---|---|---|
| 6,614,518 B1 | 9/2003 | Ishikawa et al. | |
| 2011/0242394 A1* | 10/2011 | Ohdate | H04N 5/23245 348/333.02 |

FOREIGN PATENT DOCUMENTS

| | | |
|---|---|---|
| GB | 434119 | 8/1935 |
| JP | 09-068462 | 3/1997 |

(Continued)

*Primary Examiner* — Abdullahi Nur
(74) *Attorney, Agent, or Firm* — Cozen O'Connor

(57) ABSTRACT

A photometric apparatus includes a photosensor portion that receives light and performs a measuring operation for acquiring predetermined photometric data relating to the received light, a tilt sensor portion that detects a tilt angle with respect to a predetermined reference plane, and a measurement control portion that determines a tilt state of the photosensor portion based upon the tilt angle, and executes a measurement control process for specifying the photometric data acquired by the photosensor portion as effective photometric data, when the tilt state satisfies a predetermined condition.

17 Claims, 15 Drawing Sheets

(56) References Cited

FOREIGN PATENT DOCUMENTS

| | | |
|---|---|---|
| JP | 2000-205947 | 7/2000 |
| JP | 2001-083008 | 3/2001 |
| JP | 2002-156280 | 5/2002 |
| JP | 2005-114638 | 4/2005 |
| JP | 2010-034914 | 2/2010 |
| JP | 2010-008289 | 1/2014 |

* cited by examiner

F I G. 1 2
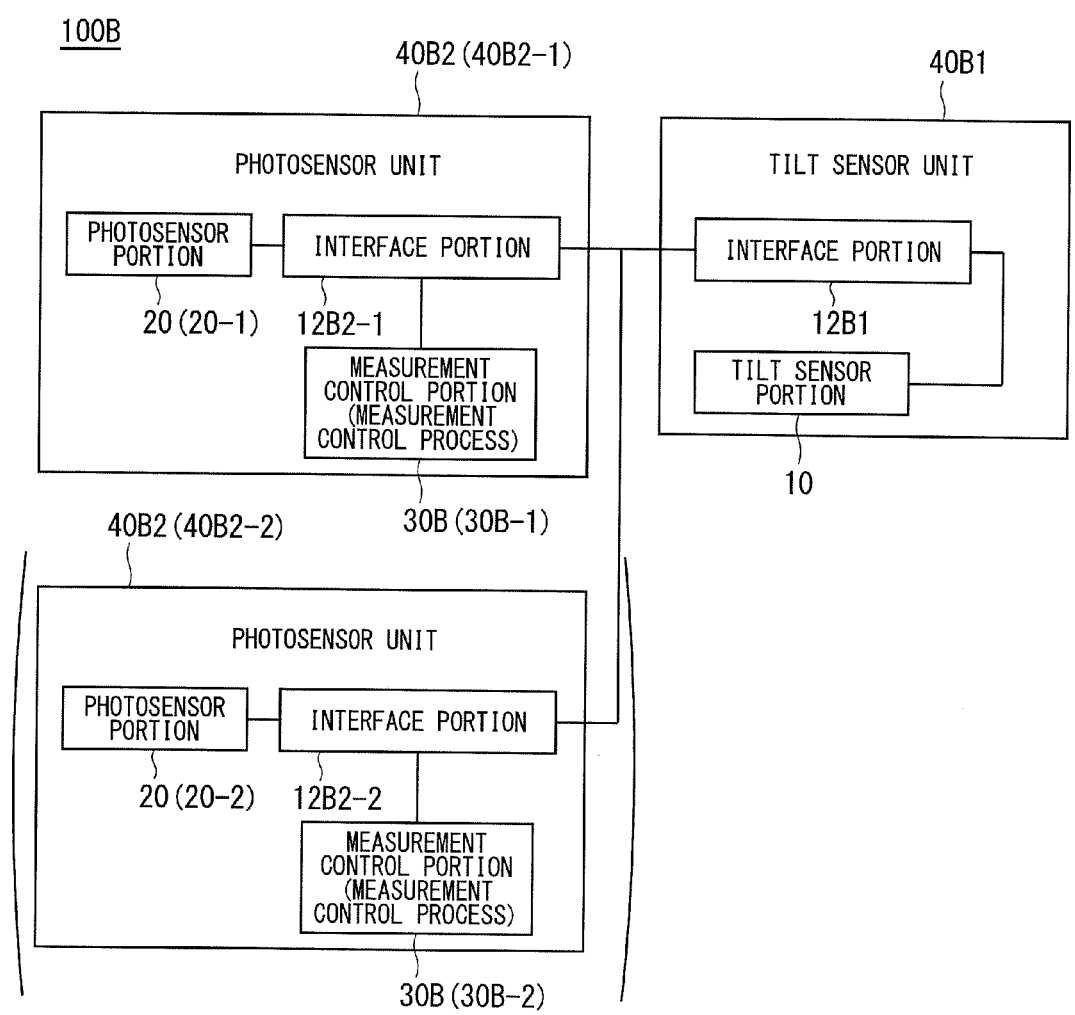

PHOTOMETRIC APPARATUS AND MEASUREMENT CONTROL PROGRAM

RELATED APPLICATIONS

This is a U.S. National stage of International application No. PCT/JP2013/057657 filed on Mar. 18, 2013.

This patent application claims the priority of Japanese application no. 2012-075952 filed Mar. 29, 2012 the disclosure content of which is hereby incorporated by reference.

TECHNICAL FIELD

The present invention relates to a photometric apparatus that measures a light environment, such as an illumination sensor, and a measurement control program, and more particularly to a technique of automatically acquiring high accurate photometric data.

BACKGROUND ART

As an apparatus (method) of measuring a light environment with light from an illumination device or sunlight, a color luminometer that can measure illumination, correlated color temperature, and color rendering properties has widely been used. For example, the technique disclosed in Patent Document 1 provides a carriageable portable color luminometer that can be carried by a user and that enables measurement at any places desired by the user, regardless of a place where a measuring device is provided.

For illumination design, horizontal illumination (detail will be described later) received by a horizontal plane or vertical illumination (detail will be described later) received by a vertical plane such as a wall face is measured. For this, a method of horizontally or vertically providing the luminometer described in Patent Document 1 with a level gauge (level) is generally employed as a method of measuring horizontal illumination or vertical illumination.

This technique has problems such that (i) workability is poor since the level gauge (level) and the luminometer are different members, (ii) usability is unsatisfactory since a horizontal place is needed, and (iii) the measurement result is incorrect due to hand movement when illumination is measured with the luminometer held by a user.

On the other hand, according to the technology disclosed in Patent Document 2, a portable cabinet includes an illumination sensor irradiated with light and a tilt sensor that detects a tilt angle with respect to a reference attitude of the cabinet, and a method for deriving the illumination around the cabinet from the tilt angle of the cabinet detected by the tilt sensor and the value corresponding to the illumination detected by the illumination sensor, by using relation specifying means for specifying a relation indicating illumination around the cabinet and the relation specified by the relation specifying means, the tilt angle of the cabinet and a value corresponding to the illumination detected by the illumination sensor as being variables, is proposed.

PRIOR ART DOCUMENTS

Patent Documents

Patent Document 1: Japanese Patent Application Laid-Open No. 2000-205947
Patent Document 2: Japanese Patent Application Laid-Open No. 2010-34914

SUMMARY OF INVENTION

Problems to be Solved by the Invention

However, the technique in Patent Document 2 described above uses the relation indicating the illumination around the cabinet by using the tilt angle of the cabinet and the value corresponding to the illumination detected by the illumination sensor as variables, and this relation is different depending upon light distribution conditions (detail will be described later) around the portion to be measured. Therefore, when the illumination is derived by using this relation, sufficient accuracy is obtained for a purpose of controlling brightness of a display portion of a portable terminal device, but there arises a problem that accuracy is not necessarily sufficient for the measurement for the above-mentioned illumination design.

The luminometer has to be placed horizontally or vertically to measure horizontal illumination or vertical illumination. For this, the problem (i), indicating that a separate level gauge (level) has to be used, still remains.

The technique in the patent document 2 is applied to a carriageable portable type. Therefore, it is considered that the user grips the luminometer with his/her hand to measure illumination, rather than the user fixes the luminometer on a desk or a tripod. In such case, the luminometer is more difficult to be fixed, resulting in that the problem involved with the correctness indicated in the above (iii) might arise.

The present invention is accomplished in view of the above circumstances, and aims to provide a photometric apparatus and a measurement control program that can solve the above-mentioned problems (i) to (iii) and that can automatically bring high accurate effective photometric data in a desired measurement state.

Means for Solving the Problems

A photometric apparatus according to an aspect of the present invention includes a photosensor portion that receives light and performs a measuring operation for acquiring predetermined photometric data relating to the received light; a tilt sensor portion that detects a tilt angle with respect to a predetermined reference plane; and a measurement control portion that determines a tilt state of the photosensor portion based upon the tilt angle, and executes a measurement control process for specifying the photometric data acquired by the photosensor portion as effective photometric data, when the tilt state satisfies a predetermined condition.

A photometric apparatus according to an aspect of the present invention includes a photosensor portion that receives light and performs a measuring operation for acquiring predetermined photometric data relating to the received light; a tilt sensor portion that detects a tilt angle with respect to a predetermined reference plane; and a measurement control portion that executes a predetermined alarm process recognizable by a user, when a tilt state of the photosensor portion, determined based upon the tilt angle, does not satisfy a predetermined condition.

Effects of the Invention

The photometric apparatus according to the aspect of the present invention can automatically obtain high accurate effective photometric data in a desired tilt state, when the user sets a predetermined condition (desired tilt angle) and executes the measurement control process.

BRIEF DESCRIPTION OF DRAWINGS

FIG. 12 is a view for describing an example of a basic functional configuration of a photometric apparatus 100B according to a third embodiment.

DESCRIPTION OF EMBODIMENTS

Figure 1:
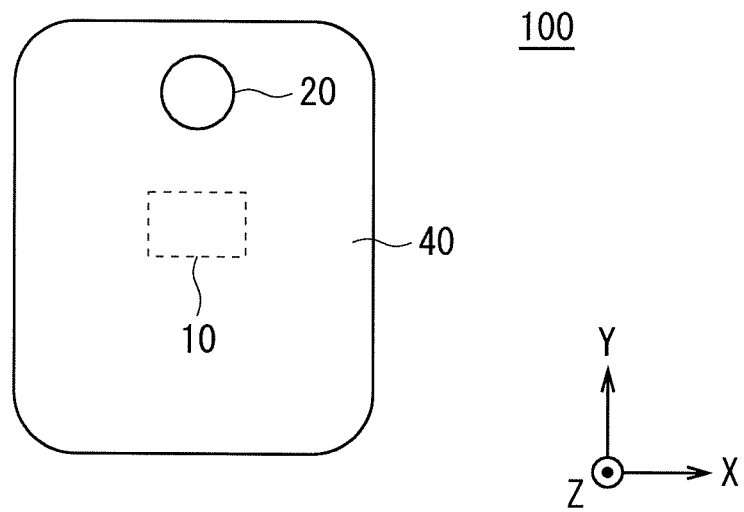
FIG. 1 is a schematic view for describing an appearance of a photometric apparatus 100 according to a first embodiment.

Embodiments of the present invention will be described below with reference to the drawings. The same numerals are given to the portions having the similar configuration and function in the drawings, and the redundant description will not be repeated in the description below. The drawings are schematically illustrated, and a size and positional relation of each component in the drawings are not correctly illustrated.

For the sake of convenience of the description, three axes of X, Y, and Z, which are mutually orthogonal, are illustrated, according to need, and an XY plane in the present specification is defined to be a plane always matching a horizontal plane.

The term "photosensor" in the present specification collectively indicates a sensor that measures a light environment such as illumination, correlated temperature, color rendering properties, and ultraviolet intensity.

1. First Embodiment

1-1. Appearance and Outline of Usage Pattern of Photometric Apparatus 100

Figure 2:
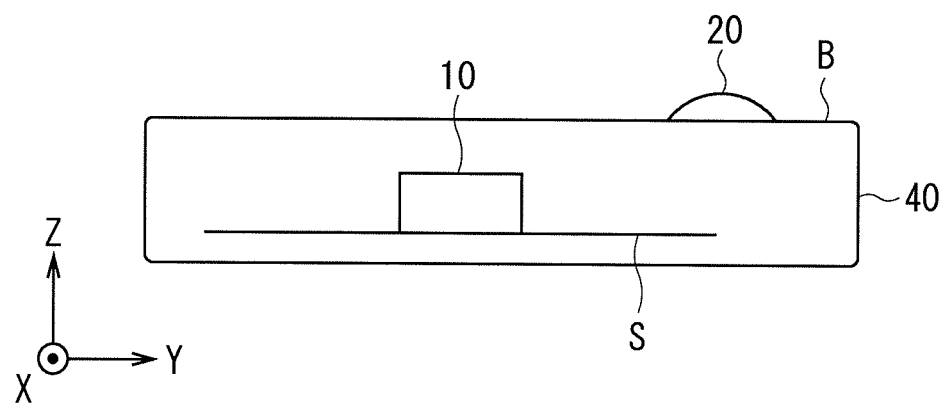
FIG. 2 is a schematic view for describing a cross-section of the photometric apparatus 100 according to the first embodiment.

FIG. 1 is a schematic view for describing an appearance of a photometric apparatus 100 according to a first embodiment of the present invention, and FIG. 2 is a schematic view for describing a cross-section of the photometric apparatus 100.

As illustrated in FIGS. 1 and 2, the photometric apparatus 100 is configured by a common unit 40 having a photosensor portion 20 that receives light and acquires predetermined photometric data relating to the received light. Conceivable examples of the common unit 40 include an electronic device of a general-purpose terminal complying with an USB standard, such as a smartphone, cellular phone, PDA, game machine, and personal computer. The common unit 40 desirably has portability such that a user can operate with his/her one hand. The photosensor portion 20 includes a photosensor that can measure a target light environment as a functional component.

The common unit 40 is a box-like sensor housing unit storing later-described components (see FIG. 6), and the photosensor portion 20 is arranged on a mounting plane (surface) B (see FIG. 2) of the common unit 40 with +Z direction being defined as a measurement surface.

1-2. General Property and Presupposition Circumstance of Illumination Received by Photosensor As a principle for describing the detail of the photometric apparatus 100 according to the first embodiment of the present invention, a general property of illumination received by a photosensor and circumstances caused by the general property, i.e., circumstances caused in the background art, will be described.

Figure 3:
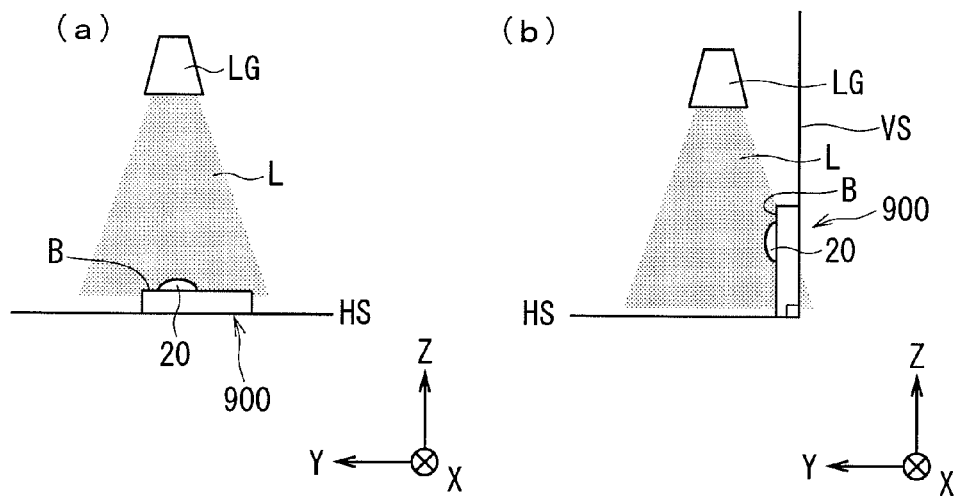
FIG. 3 is a view for describing horizontal illumination and vertical illumination.
Figure 4:
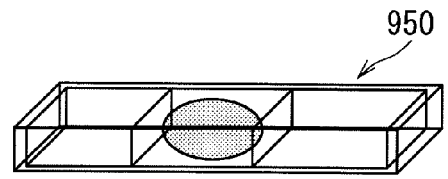
FIG. 4 is a view illustrating a level gauge (level).

A usage pattern and usage method for measuring illumination by using a conventional luminometer will be described. FIG. 3 is a view illustrating a usage pattern of a luminometer when illumination is measured by the luminometer, wherein part (a) of FIG. 3 is a schematic view for describing a measurement of horizontal illumination, and part (b) of FIG. 3 is a schematic view for describing a measurement of vertical illumination. FIG. 4 is a view illustrating a level gauge (level) used for the illumination measurement in FIG. 3. It is considered that a conventional luminometer (photometric apparatus) 900 illustrated in FIG. 3 has a configuration similar to the above-mentioned common unit 40 having the photosensor portion 20.

As illustrated in part (a) of FIG. 3, when light L from an illumination device LG is emitted, the luminometer 900 is set such that the mounting plane B of the photosensor portion 20 is parallel to a horizontal surface HS such as a desk or a floor surface, for example, to measure horizontal illumination.

On the other hand, as illustrated in part (b) of FIG. 3, when light L from the illumination device LG is emitted, the luminometer 900 is set such that the mounting plane B of the photosensor portion 20 is parallel to a vertical surface VS such as a wall face at right angles to the horizontal surface HS such as a desk or a floor surface to measure vertical illumination.

For the measurement of horizontal illumination or vertical illumination, the luminometer has to be set such that the mounting plane B of the photosensor portion 20 of the luminometer 900 becomes parallel to the horizontal surface HS or the vertical surface VS. Therefore, when illumination is measured by using the photometric apparatus such as the conventional luminometer 900, a level gauge (level) 950 illustrated in FIG. 4 has to be always prepared, and a set position (measurement place) of the luminometer 900 has to be determined by using the level gauge (level) 950.

Next, illumination of light received by the photosensor portion 20 will be described below.

Illumination of light received by the photosensor portion 20 is roughly classified into a factor relating to a sensor sensitivity and a factor relating to a light distribution, and the illumination corresponds to a value obtained by multiplying both factors and integrating the resultant product. The factor relating to the sensor sensitivity has an oblique-incident light characteristic (light-receiving angle characteristic). The oblique-incident light characteristic means that illumination of a measurement surface becomes 100% when an angle of incident light is 0 degree with respect to a normal line of the measurement surface, and the illumination becomes 0% when the angle of the incident light is 90 degrees with respect to the normal line. The factor relating to the light distribution, i.e., intensity of light incident on the photosensor portion 20 every incident angle, is multiplied to the oblique-incident light characteristic, and the obtained product is integrated, whereby the illumination is obtained.

Figure 5:
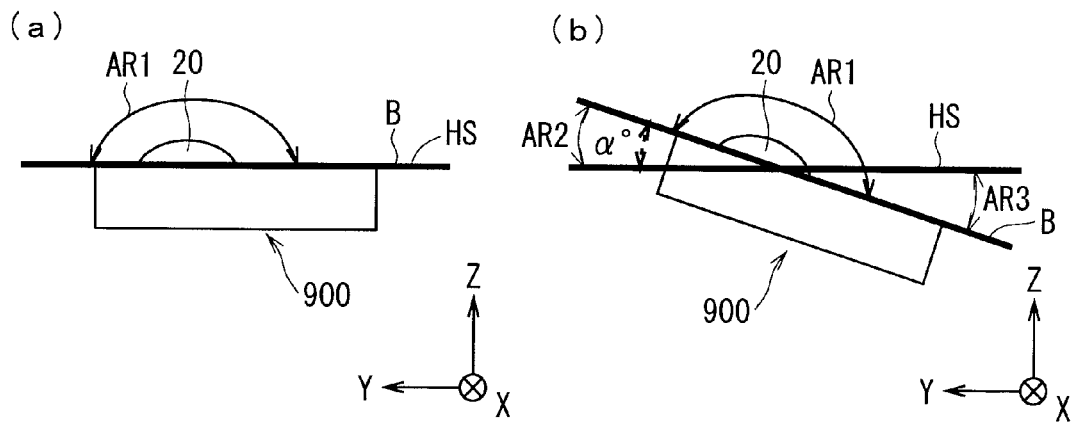
FIG. 5 is a view for describing illumination measured by a photosensor portion.

Next, problems caused when illumination is measured by using the luminometer 900 will be described. FIG. 5 is a view for describing illumination measured on the measurement surface of the photosensor portion 20, wherein part (a) of FIG. 5 illustrates the case where the mounting plane B matches the horizontal surface HS, and part (b) of FIG. 5 illustrates the case where the mounting plane B tilts at an angle of $\alpha°$ with respect to the horizontal surface HS.

As illustrated in part (a) of FIG. 5, when the mounting plane B where the photosensor portion 20 is mounted matches the horizontal surface HS, the range where the measurement surface of the photosensor portion 20 receives light corresponds to a range of an arrow AR1, so that the luminometer 900 measures a condition of light incident on the whole range at an angle of 180° above the horizontal surface HS. Therefore, the luminometer 900 can accurately measure the horizontal illumination.

On the other hand, as illustrated in part (b) of FIG. 5, when a horizontal surface is not present at a place where illumination is to be measured, the set position of the luminometer 900 has to be determined by using the level gauge (level) 950. Therefore, illumination is often measured with the mounting plane B tilting at an angle of $\alpha°$ ($\alpha \neq 0$) with respect to the horizontal surface HS due to an error in the set position. When the luminometer 900 tilts at the angle of $\alpha°$ as described above, light at the angle of $\alpha°$ (arrow AR2) from the horizontal surface HS does not enter the measurement surface of the photosensor portion 20, so that an error is generated with respect to the measured value obtained by accurately measuring the horizontal illumination (see part (a) of FIG. 5).

The above-mentioned oblique-incident light characteristic corresponding to the sensor sensitivity has already been known upon a factory shipment. However, the light distribution incident on a sensor in a measuring scene is different for each measuring scene. The illumination measured on the measurement surface of the photosensor portion 20 depends upon both the factor relating to the sensor sensitivity and the factor relating to the light distribution as described above, and only information of the integration value is acquired in the measurement by the photosensor portion 20. For example, when the luminometer 900 tilts at the angle of $\alpha°$ (see part (b) of FIG. 5), light at the angle of $\alpha°$ from the horizontal surface is not received by the photosensor unit, while light at the angle of $\alpha°$ toward the opposite side is received by the photosensor portion. Therefore, an error is generated in the measured value, compared to the case where the horizontal illumination is measured (see part (a) of FIG. 5). However, the photosensor portion 20 cannot obtain the difference between a quantity of another incident light (the range of the arrow AR3 in part (b) of FIG. 5) and the quantity of light that is not incident (the range of the arrow AR2 in part (b) of FIG. 5), with respect to the measurement of the horizontal illumination, the difference being generated since the luminometer 900 tilts at the angle of $\alpha°$. Accordingly, the photosensor portion 20 cannot correct the difference in the measured value caused by the tilt.

Since the illumination of light received by the photosensor portion 20 is obtained such that the above-mentioned both factors are multiplied, and the resultant product is integrated, as described above, the contributory portion of both factors is unclear. Therefore, it can be said that it is substantially impossible to obtain the measured value of the horizontal illumination by correcting the measured value of the luminometer 900 that tilts with respect to the horizontal surface.

Under such background, the present invention provides a photometric apparatus and a measurement control program that can automatically provide high accurate effective photometric data with a desired tilt angle by controlling the measurement of the photosensor portion 20 by means of a tilt sensor.

1-3. Specific Configuration and Basic Functional Configuration of Photometric Apparatus 100

The specific configuration of the photometric apparatus 100 will be described with reference again to FIGS. 1 and 2. As illustrated in FIGS. 1 and 2, the photometric apparatus 100 includes a tilt sensor portion 10 that detects a tilt angle (the tilt angle is 0 degree in FIG. 2) of the reference plane S to the XY plane (horizontal plane), in addition to the above-mentioned photosensor portion 20. Various sensors that can detect the tilt angle can be employed as the tilt sensor, such as an acceleration sensor or gyroscope.

Figure 6:
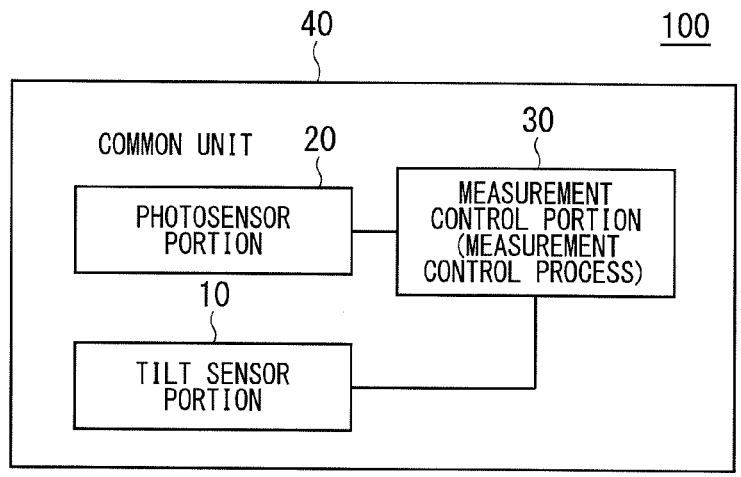
FIG. 6 is a diagram illustrating an example of a basic functional configuration of the photometric apparatus 100 according to the first embodiment.

FIG. 6 is a diagram illustrating an example of a basic functional configuration of the photometric apparatus 100 according to the first embodiment of the present invention. As illustrated in FIG. 6, the photometric apparatus 100 includes a measurement control portion 30 in addition to the photosensor portion 20 and the tilt sensor portion 10. The measurement control portion 30 determines the tilt state of the photosensor portion 20 based upon the tilt angle acquired from the tilt sensor portion 10, and executes a measurement control process for specifying the photometric data acquired from the photosensor portion 20 as effective photometric data when the tilt state satisfies a predetermined condition set by a user. The predetermined condition (set condition) is a tilt angle the user intends to measure, such as horizon (0 degree) or vertical tilt (90 degrees), and this condition is set beforehand in the measurement control portion 30.

The measurement control process by the measurement control portion 30 in the present embodiment means a process of allowing the photosensor portion 20 to execute the measuring operation, when the tilt state satisfies the set condition. The effective photometric data is set as the photometric data. Specifically, if the tilt state is other than the set condition (for example, the photometric apparatus 100 tilts from the horizontal state or the vertical state that is the set condition), a light environment is not measured, and only when the tilt state satisfies the set condition, a light environment is measured, and the measured value is set as effective photometric data.

As described above, the common unit 40 includes therein the photosensor portion 20, the tilt sensor portion 10, and the measurement control portion 30, wherein the tilt sensor portion 10 is mounted on the reference plane S and the photosensor portion 20 is mounted on the mounting plane B parallel to the reference plane S (see FIGS. 2 and 6). FIG. 2 illustrates that the reference plane S and the mounting plane B are different, but they are most preferably the same plane.

As described above, in the photometric apparatus 100 according to the first embodiment, the user preliminarily sets the desired tilt state as the set condition, and the measurement control portion 30 executes the measurement control process, whereby high accurate effective photometric data with the desired tilt angle can automatically be obtained.

Since the apparatus includes the tilt sensor portion 10, a preparation operation in which the user visually recognizes the state of the separately-provided level gauge (level) 950 (see FIG. 4) to start the measurement, as is conventionally done, is unnecessary. Therefore, the operating load of the user can be reduced. Even if the user uses the photometric apparatus 100 in a place where he/she cannot visually recognize the apparatus 100, the user can obtain high accurate effective photometric data. Accordingly, the photometric apparatus 100 brings an effect of enhancing a degree of freedom of the measurement place.

Since a conventional work for preparing the level gauge (level) 950 in addition to the photosensor portion 20 is unnecessary, cost and labor for the user can be reduced. In addition, a work for aligning the surface of the photosensor portion 20 and the surface of the separately-provided level gauge (level) 950 is unnecessary, whereby labor of the user can be reduced.

In the photometric apparatus 100 according to the first embodiment, the photosensor portion 20 and the tilt sensor portion 10 are provided in the common unit 40. If the reference plane S on which the tilt sensor portion 10 is mounted and the mounting plane B on which the photosensor portion 20 is mounted are the same plane, the tilt sensor portion 10 is arranged close to the photosensor portion 20, whereby the tilt angle of the photosensor portion 20 can accurately be detected by the tilt sensor portion 10.

The measurement control portion 30 executes the measurement control process, whereby the execution time of the measuring operation by the photosensor portion 20 can be minimized. Consequently, the photosensor portion 20 can efficiently be used. With this, power saving of the whole photometric apparatus 100 can be realized.

1-4. Basic Operation of Photometric Apparatus 100

Subsequently, a measurement control program (application software) for realizing the operation of the photometric apparatus 100 according to the first embodiment will be described. The measurement control program is a program in the photometric apparatus 100 including the photosensor portion 20 that receives light and performs a measuring operation for acquiring predetermined photometric data relating to the received light, and the tilt sensor portion 10 that detects the tilt angle of the reference plane S with respect to the horizontal surface. This program is installed into the photometric apparatus 100, and executed, whereby the measurement control portion 30 can be functioned.

Figure 7:
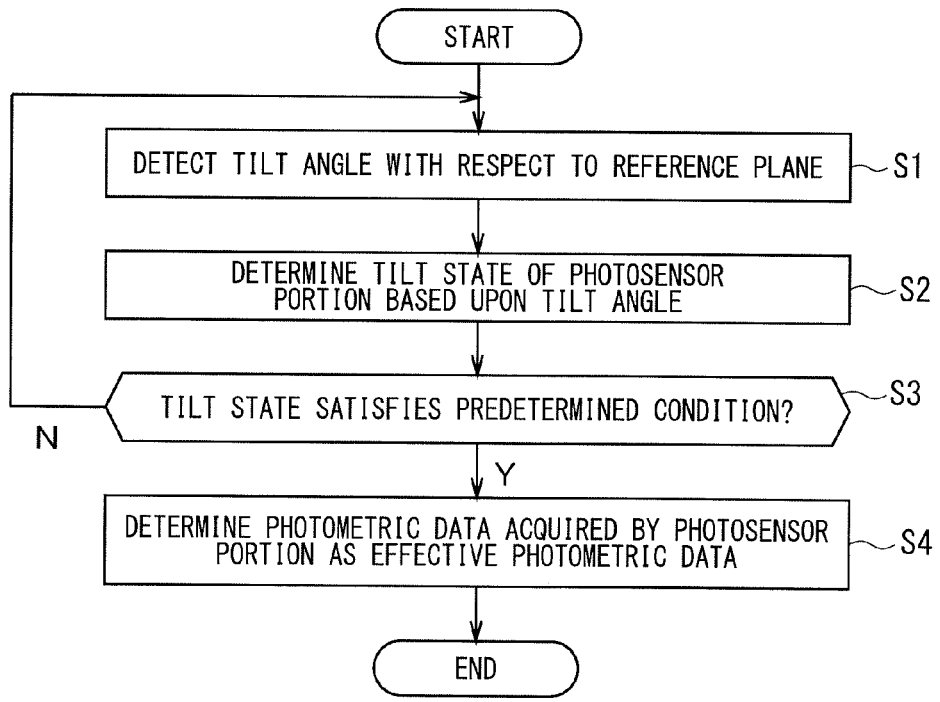
FIG. 7 is a flowchart for describing a basic operation realized by the photometric apparatus 100 according to the first embodiment.

FIG. 7 is a flowchart for describing the basic operation of the photometric apparatus 100 according to the first embodiment. In FIG. 7, it is supposed that the reference plane S on which the tilt sensor portion 10 is mounted and the mounting plane B on which the photosensor portion 20 is mounted are the same plane or parallel to each other. Since the individual function of each component has already been described (see FIG. 6), only the entire flow will be described here.

As illustrated in FIGS. 2 and 7, the tilt sensor portion 10 detects the tilt angle of the reference plane S with respect to the XY plane (horizontal surface) in step S1.

In Step S2, the measurement control portion 30 determines the tilt state of the photosensor portion 20 based upon the tilt angle detected in step S1.

In Step S3, the measurement control portion 30 determines whether the tilt state determined in step S2 satisfies a set condition or not. When it does not satisfy the set condition, the process returns to step S1 to position again the photometric apparatus, and detect a tilt angle. On the other hand, when the measurement control portion 30 determines that the tilt state satisfies the set condition, the process proceeds to step S4. Specifically, when the user would like to measure the horizontal illumination, and the horizontal surface is set as the set condition (when the tilt angle is set as 0 degree), the measurement control portion 30 determines whether the tilt angle satisfies 0 degree or not. When the vertical surface is set as the set condition (when the tilt angle is set as 90 degrees), the measurement control portion 30 determines whether the tilt angle satisfies 90 degrees or not. When a desired angle is preliminarily set as the set condition, the measurement control portion 30 determines whether the tilt angle satisfies the desired angle or not.

A range where a shift in the tilt angle is allowed as an error in the determination as to whether the tilt angle satisfies the set condition or not will be described.

If an error of about 3% from the measured value is allowed in the case where only the oblique-incident light characteristic is considered, the range of ±1 degree can be allowed as an error. Therefore, when the tilt angle is within a range of ±1 degree from the set condition, the measurement control portion 30 makes "Y" determination in step S3, and when the tilt angle exceeds the range of ±1 degree, the measurement control portion 30 makes "N" determination in step S3. Alternatively, if an error of about 10% from the measured value is allowed, an error in the range of ±3 degrees can be allowed as an error. Therefore, when the tilt angle is within a range of ±3 degree from the set condition, the measurement control portion 30 makes "Y" determination in step S3, and when the tilt angle exceeds the range of ±3 degree, the measurement control portion 30 makes "N" determination in step S3.

In step S4, the measurement control portion 30 allows the photosensor portion 20 to execute the measuring operation, and determines the photometric data acquired by the photosensor portion 20 as effective photometric data. Thus, this operation is ended.

As described above, in the photometric apparatus 100 according to the first embodiment, a set condition is preliminarily set for the tilt state, desired by the user, of the photosensor portion, and the measurement control program executes steps S1 to S4, whereby high accurate effective photometric data can automatically be obtained.

2. Second Embodiment

In the photometric apparatus 100 according to the first embodiment, the tilt sensor portion 10, the photosensor portion 20, and the measurement control portion 30 are configured as a common unit. On the other hand, in a photometric apparatus 100A according to the second embodiment, these components are separated, so that the photometric apparatus 100A includes plural units.

<2-1. Specific Configuration and Basic Functional Configuration of Photometric Apparatus 100A>

Figure 8:
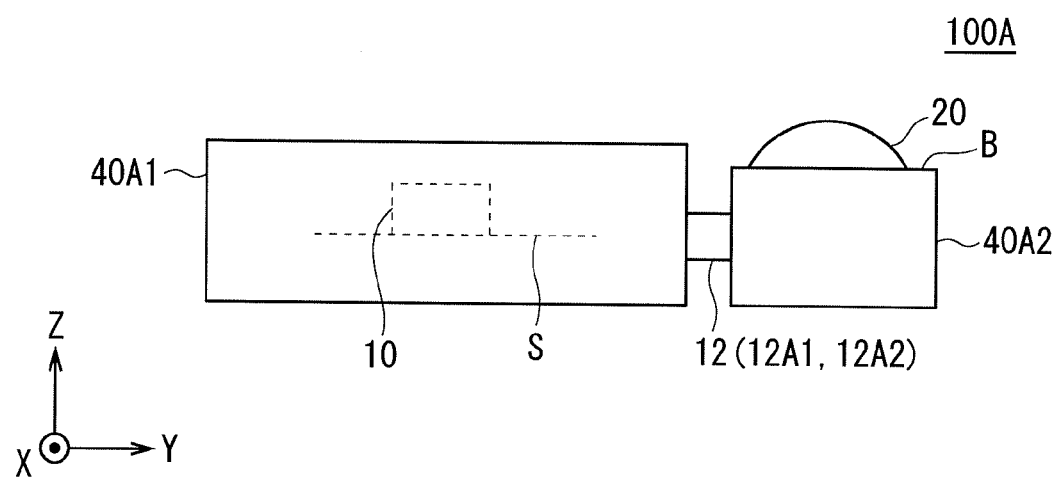
FIG. 8 is a view for describing an example of a configuration of a photometric apparatus 100A according to a second embodiment.
Figure 9:
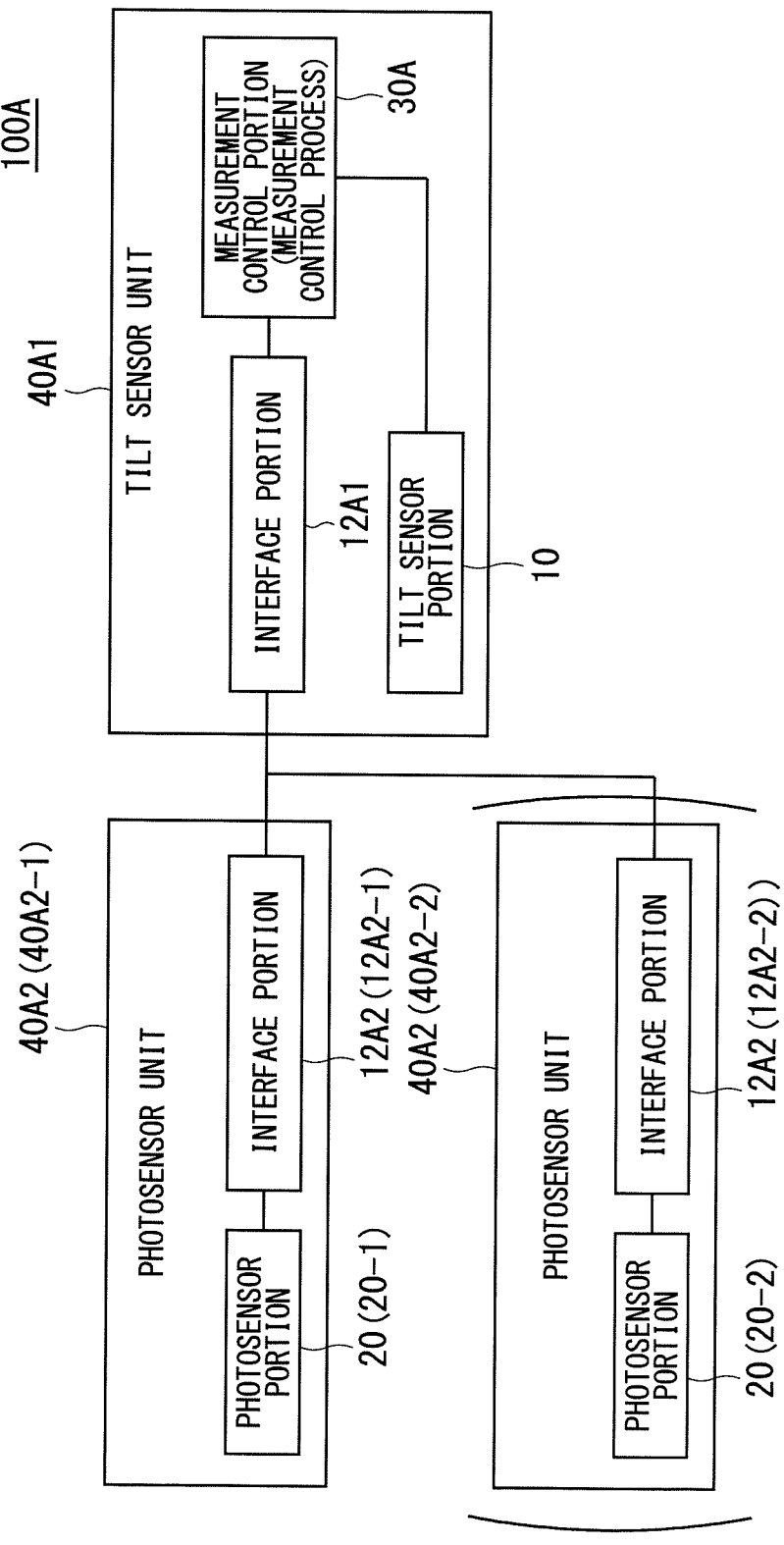
FIG. 9 is a diagram illustrating an example of a basic functional configuration of the photometric apparatus 100A according to the second embodiment.

FIG. 8 is a view for describing an example of a configuration of the photometric apparatus 100A according to the second embodiment, and FIG. 9 is a diagram for describing an example of a basic functional configuration of the photometric apparatus 100A.

The schematic configuration and function of the photometric apparatus 100A according to the second embodiment is different from the first embodiment in that, as shown in FIGS. 8 and 9, the photometric apparatus 100A includes a tilt sensor unit 40A1 having therein the tilt sensor portion 10 mounted on the reference plane S and a measurement control portion 30A, and a photosensor unit 40A2 having therein the photosensor portion 20.

Specifically, the tilt sensor unit 40A1 and the photosensor unit 40A2 are combined to form a structure, and this structure has portability. Further, the tilt sensor unit 40A1 and the photosensor unit 40A2 are connected to each other such that the tilt sensor portion 10 and the photosensor portion 20 have a physical positional relationship (positional relationship in which a predetermined tilt angle difference is set) set beforehand. The measurement control portion 30A can control the measuring operation of the photosensor portion 20. The measurement control portion 30A preliminarily recognizes the physical positional relationship, and determines the tilt state of the photosensor portion 20 based upon the physical positional relationship as well as the tilt angle. The other configuration and the function are similar to those of the photometric apparatus 100 according to the first embodiment.

Figure 10:
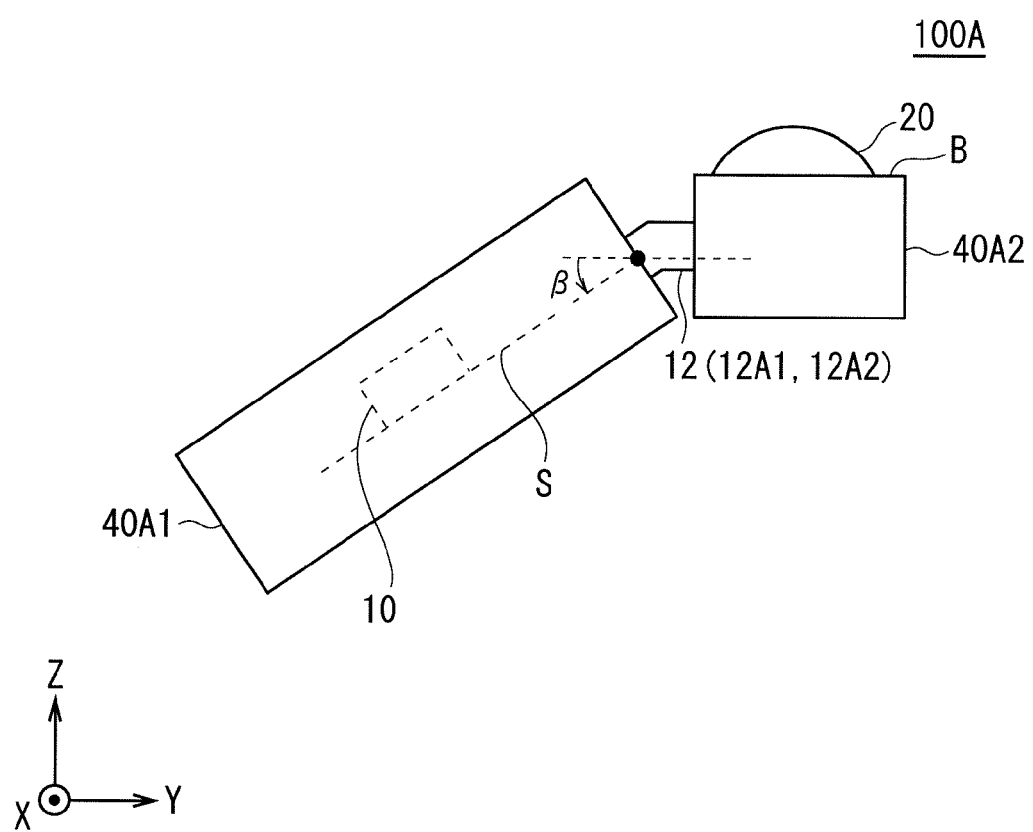
FIG. 10 is a view for describing an example of another configuration of the photometric apparatus 100A according to the second embodiment.

The "physical positional relationship" in the present embodiment may be "a positional relationship in which the mounting plane B on which the photosensor portion 20 in the photosensor unit 40A2 is mounted and the reference plane S on which the tilt sensor portion 10 in the tilt sensor unit 40A1 is mounted are parallel to each other" as illustrated in FIG. 8 or a positional relationship in which the mounting plane B on which the photosensor portion 20 is mounted and the reference plane S have a predetermined tilt angle difference β° set beforehand as illustrated in FIG. 10.

Specifically, as illustrated in FIG. 9, the photosensor unit 40A2 (40A2-1, 40A2-2) in the photometric apparatus 100A includes an interface portion 12A2 (12A2-1, 12A2-2), a photosensor portion 20 (20-1, 20-2), and a peripheral circuit portion (not illustrated) that is a circuit portion for operating these units in association with each other. The photosensor unit 40A2 can be connected to the tilt sensor unit 40A1 via interface portions 12A1 and 12A2 (12A2-1, 12A2-2), whereby signals can be received and sent between the photosensor unit 40A2 (40A2-1, 40A2-2) and the tilt sensor unit 40A1.

In FIG. 9, two photosensor units 40A2-1 and 40A2-2 are provided as the photosensor unit 40A2. However, the number of the photosensor unit is not limited to two, and plural photosensor units as much as possible considering the structure can be provided, so long as they can be integrally combined to the tilt sensor unit 40A1. If a high priority is put on portability, only one photosensor unit 40A2 is desirably provided.

As described above, the photometric apparatus 100A according to the second embodiment forms a structure by combining the photosensor unit 40A2 and the tilt sensor unit 40A1, which are connected to each other, whereby the photometric apparatus 100A can realize the structure having portability in a daily life, and can bring high accurate effective photometric data.

As illustrated in FIG. 9, plural photosensor units 40A2-1 and 40A2-2 are connected to one tilt sensor unit 40A1 as the photosensor unit 40A2, for example. With this configuration, simultaneous photometry can be realized by using plural photosensor portions 20-1 and 20-2, whereby workability is enhanced (see FIG. 9). For example, plural measurements can be simultaneously carried out when a light environment is measured plural times in consideration of a measurement variation, whereby the number of measurements can be reduced. In addition, a light environment can be measured simultaneously at almost the same place with different types of photosensors (e.g., illumination sensor and ultraviolet sensor).

<2-2. Basic Operation of Photometric Apparatus 100A>

Subsequently, a measurement control program (application software) for realizing the operation of the photometric apparatus 100A according to the second embodiment will be described. As described above, the photometric apparatus 100A includes the tilt sensor unit 40A1 having therein the tilt sensor portion 10 mounted on the reference plane S, and the photosensor unit 40A2 having therein the photosensor portion 20, wherein the tilt sensor unit 40A1 and the photosensor unit 40A2 are connected such that the tilt sensor portion 10 and the photosensor portion 20 have the physical positional relationship (the reference plane S and the mounting plane B are parallel to each other) described above. The measurement control program is installed into the photometric apparatus 100A, and executed, whereby the measurement control portion 30A can be functioned.

Figure 11:
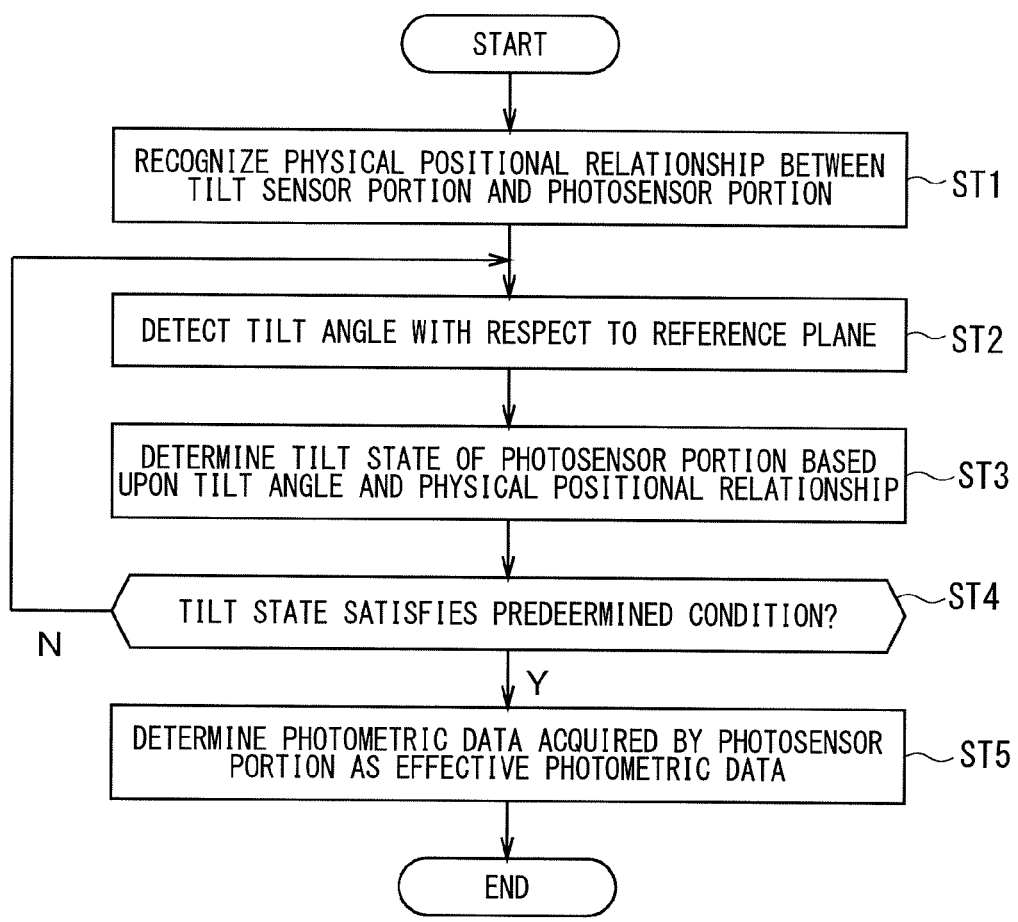
FIG. 11 is a flowchart for describing a basic operation realized by the photometric apparatus 100A according to the second embodiment.

FIG. 11 is a flowchart for describing the basic operation of the photometric apparatus 100A according to the second embodiment. Steps ST1 to ST5 described below are executed by one of the tilt sensor unit 40A1 and the photosensor unit 40A2.

Since the individual function of each component has already been described (see FIG. 9), only the entire flow will be described here. Steps ST2, ST4, and ST5 in FIG. 11 are similar to steps S1, S3, and S4 in FIG. 7, so that the description thereof will be skipped.

In the photometric apparatus 100A according to the second embodiment, the tilt sensor unit 40A1 and the photosensor unit 40A2 are separately provided, and the process described below is added.

Specifically, in step ST1, the measurement control portion 30A preliminarily recognizes the physical positional relationship between the tilt sensor portion 10 and the photosensor portion 20 (20-1, 20-2). Specifically, data indicating the physical positional relationship between the tilt sensor portion 10 and the photosensor portion 20 is stored beforehand in the photosensor portion 20, and the measurement control portion 30A reads this data from the photosensor portion 20 in step ST1.

The process in step ST2 similar to the process in the first embodiment is executed, and then, in step ST3, the measurement control portion 30A determines the tilt state of the photosensor portion 20 (20-1, 20-2) based upon the tilt angle in step ST2 and the physical positional relationship as illustrated in FIG. 11. In the second embodiment, the mounting plane B for the photosensor portion 20 and the reference plane S for the tilt sensor portion 10 have a parallel physical positional relationship. Therefore, the measurement control portion 30A determines the tilt state of the photosensor portion 20 based upon the tilt angle, as in the first embodiment.

Finally, after the processes in steps ST4 to ST5 similar to the processes in the first embodiment are executed, this operation flow is ended.

As described above, the measurement control program corresponding to the photometric apparatus 100A according to the second embodiment executes the steps ST1 to ST5, whereby high accurate effective photometric data can be obtained in the photometric apparatus 100A having a combined structure of the photosensor unit 40A2 and the tilt sensor unit 40A1.

3. Third Embodiment

FIG. 12 is a diagram illustrating an example of a basic functional configuration of a photometric apparatus 100B according to the third embodiment. The schematic configuration and function of the photometric apparatus 100B according to the third embodiment is different from the first embodiment in that the photometric apparatus 100B includes a tilt sensor unit 40B 1 having therein the tilt sensor portion 10 mounted on the reference plane S, and a photosensor unit 40B2 having therein the photosensor portion 20 and a measurement control portion 30B. The third embodiment is different from the second embodiment in that the measurement control portion 30B is present in the photosensor unit 40B2, while the measurement control portion 30A in the second embodiment is present in the tilt sensor unit 40A1 (see FIGS. 9 and 12).

Specifically, the tilt sensor unit 40B 1 and the photosensor unit 40B2 are connected to each other such that the tilt sensor portion 10 and the photosensor portion 20 have the physical positional relationship. The measurement control portion 30B can acquire information about the tilt angle detected by the tilt sensor portion 10. The measurement control portion 30B preliminarily recognizes the physical positional relationship, and determines the tilt state of the photosensor portion 20 based upon the physical positional relationship as well as the tilt angle. The other configuration and the function are similar to those of the photometric apparatus 100A according to the second embodiment.

Specifically, as illustrated in FIG. 12, the photosensor unit 40B2 (40B2-1, 40B2-2) in the photometric apparatus 100B, includes an interface portion 12B2 (12B2-1, 12B2-2), a photosensor portion 20 (20-1, 20-2), the measurement control portion 30B (30B-1, 30B-2), and a peripheral circuit portion (not illustrated) that is a circuit portion for operating these units in association with each other. The photosensor unit 40B2 can be connected to the tilt sensor unit 40B1 via interface portions 12B1 and 12B2 (12B2-1, 12B2-2), whereby signals can be received and sent between the photosensor unit 40B2 (40B2-1, 40B2-2) and the tilt sensor unit 40B 1.

In the second embodiment, the measurement control portion 30A is present in the tilt sensor unit 40A1. Therefore, when a uniform control is executed by using the plural photosensor units 40A2-1 and 40A2-2 as the photosensor unit 40A2, the measurement is generally carried out under the same set condition. However, in the third embodiment, the measurement control portion 30B is present in each of the plural photosensor units 40B2-1 and 40B2-2. Therefore, the measurement can relatively easily be carried out by each of the measurement control portions 30B-1 and 30B-2 by changing the set condition. For example, the photosensor unit 40B2-1 measures the horizontal illumination, and at the same time, the photosensor unit 40B2-2 can measure the vertical illumination.

In FIG. 12, the two photosensor units 40B2-1 and 40B2-2 are provided as the photosensor unit 40A2. However, the number of the photosensor unit is not limited to two, and plural photosensor units as much as possible considering the structure can be provided, so long as they can be integrally combined to the tilt sensor unit 40B1. If a high priority is put on portability, only one photosensor unit 40B2 is desirably provided.

As described above, the photometric apparatus 100B according to the third embodiment forms a structure by combining the photosensor unit 40B2 and the tilt sensor unit 40B1, which are connected to each other, whereby the photometric apparatus 100B can realize the structure having portability in a daily life, and can bring high accurate effective photometric data.

Plural photosensor units 40B2-1 and 40B2-2 are connected to one tilt sensor unit 40B1 as the photosensor unit 40B2, whereby various simultaneous photometry can be realized by the measurement control portions 30B-1 and 30B-2 included in each of the plural photosensor portions 20-1 and 20-2 (see FIG. 12). Accordingly, workability is enhanced (see FIG. 12).

4. Fourth Embodiment

Figure 13:
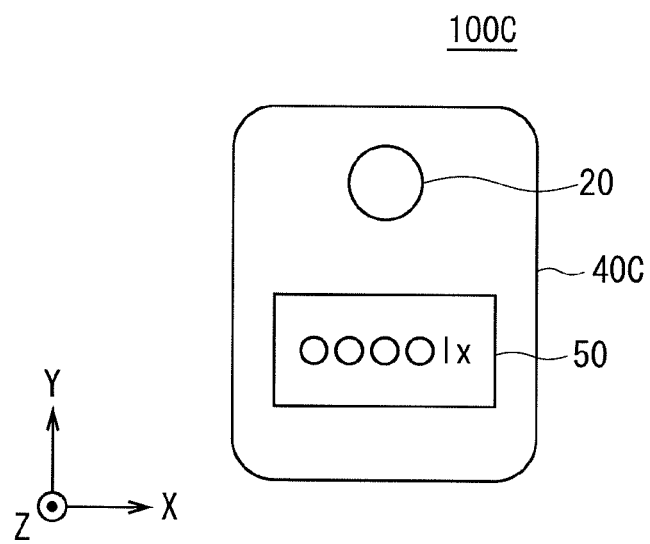
FIG. 13 is a schematic view illustrating an appearance of a photometric apparatus 100C according to a fourth embodiment.
Figure 14:
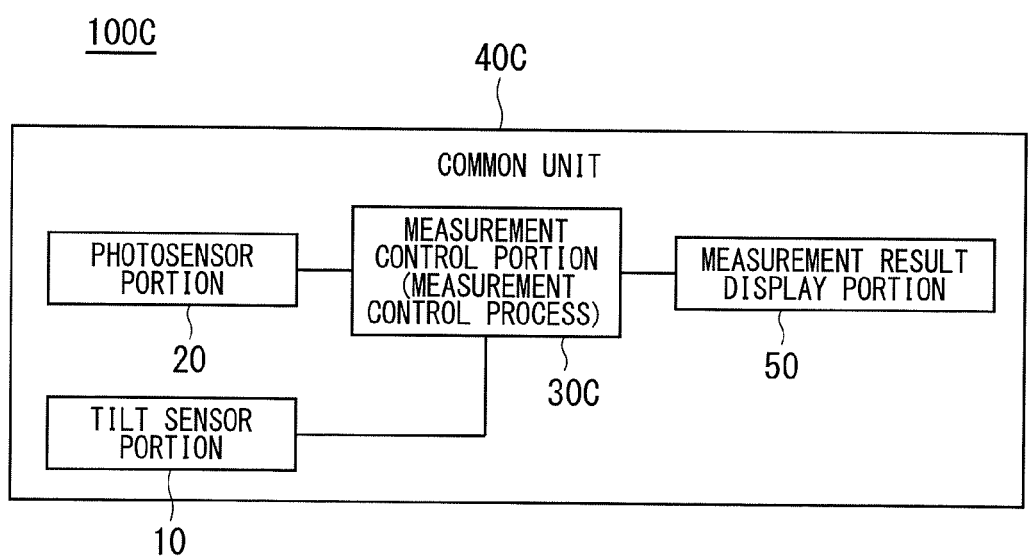
FIG. 14 is a diagram for describing an example of a basic functional configuration of the photometric apparatus 100C according to the fourth embodiment.

FIG. 13 is a diagram illustrating an example of a specific configuration of a photometric apparatus 100C according to the fourth embodiment, and FIG. 14 is a diagram illustrating an example of a basic functional configuration of the photometric apparatus 100C according to the fourth embodiment. The schematic configuration and function of the photometric apparatus 100C according to the fourth embodiment is different from the first embodiment in that the photometric apparatus 100C further includes a measurement result display portion 50 displaying photometric data, and the measurement control portion 30 is replaced by a measurement control portion 30C that can also control the measurement result display portion 50, as illustrated in FIGS. 13 and 14. The other configuration and the function are similar to those of the photometric apparatus 100 according to the first embodiment.

Specifically, as illustrated in FIG. 14, a common unit 40C in the photometric apparatus 100C includes the measurement control portion 30C and the measurement result display portion 50, in addition to the tilt sensor portion 10 and the photosensor portion 20. The photosensor portion 20 continuously executes a measuring operation, and the measurement control process in the present embodiment means a process of allowing the measurement result display portion 50 to display photometric data, when the tilt state satisfies a condition (predetermined condition) set by a user. In other words, the effective photometric data corresponds to the photometric data displayed on the measurement result display portion 50 after the tilt state satisfies the set condition.

Two display manners described below are considered as the display manner of the measurement result display portion 50. In the first manner, a light environment is always measured by the photosensor portion 20, regardless of the set condition, but under the condition (the condition in which the photometric apparatus 100C tilts against the set condition) other than the set condition, the display of this result may be continuously updated on the measurement result display portion 50, and when the tilt state satisfies the set condition, the display content may be fixed. In the first manner, the photometric data finally fixedly displayed after the tilt state satisfies the set condition becomes the effective photometric data. In the second manner, a light environment is always measured by the photosensor portion 20, as in the first manner, under the condition other than the set condition, this result is not displayed on the measurement result display portion 50, and when the tilt state satisfies the set condition, the result is displayed on the measurement result display portion 50. In the second manner, the photometric data displayed on the measurement result display portion 50 after the tilt state satisfies the set condition becomes the effective photometric data.

A liquid crystal display forming the measurement result display portion 50 is desirably a reflective type in order to prevent the photosensor portion 20 from receiving extra light. The measurement result display portion 50 displays the result of the measurement data acquired by the photosensor portion 20. Alternatively, data is analyzed with desired application software, and the measurement result display portion 50 may display the result according to the analyzed result.

In the photometric apparatus 100C, the measurement result display portion 50 can be mounted to the photometric apparatus 100 according to the first embodiment as described above, and further, can be mounted to the photometric apparatus 100A according to the second embodiment or to the photometric apparatus 100B according to the third embodiment. When the measurement result display portion 50 is applied to the photometric apparatus 100A, it may be provided to either one of the tilt sensor unit 40A1 or the photosensor unit 40A2. When the measurement result display portion 50 is applied to the photometric apparatus 100B, it may also be provided to either one of the tilt sensor unit 40B 1 or the photosensor unit 40B2.

As described above, in the photometric apparatus 100C according to the fourth embodiment, the user can recognize the photometric data on the measurement result display portion 50, whereby operability and workability are enhanced.

The measurement control portion 30C executes the measurement control process, thereby suppressing the execution time of the display operation of the measurement result display portion 50 to a minimum necessary (in particular, when the second embodiment is employed). Accordingly, the measurement result display portion 50 can efficiently be used, resulting in that power saving of the entire photometric apparatus 100C can be realized.

5. Fifth Embodiment

Figure 15:
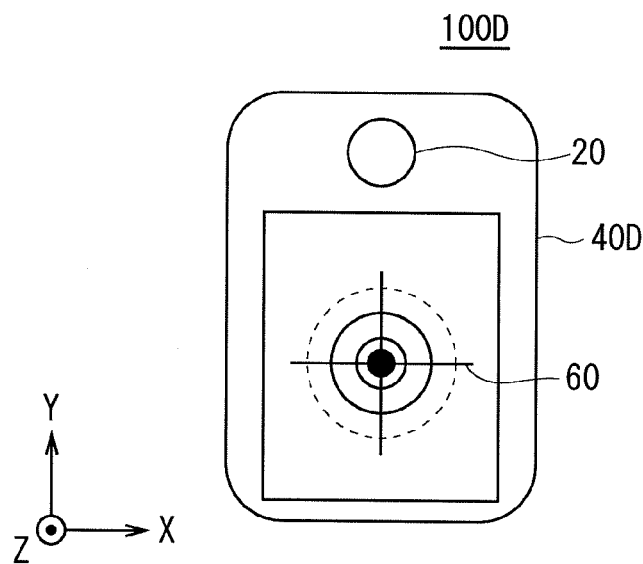
FIG. 15 is a schematic view illustrating an appearance of a photometric apparatus 100D according to a fifth embodiment.
Figure 16:
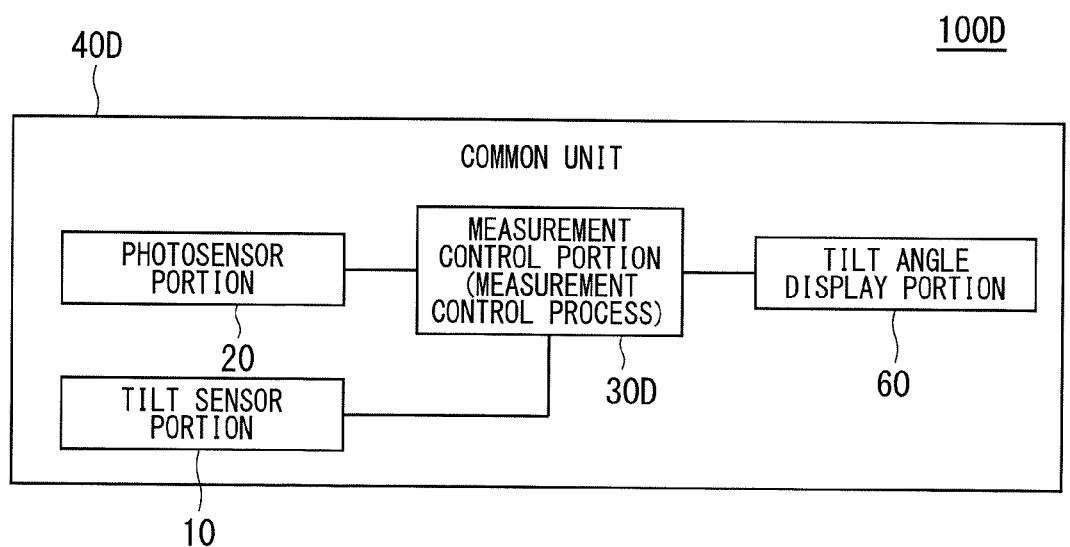
FIG. 16 is a diagram for describing an example of a basic functional configuration of the photometric apparatus 100D according to the fifth embodiment.

FIG. 15 is a diagram illustrating an example of a specific configuration of a photometric apparatus 100D according to the fifth embodiment, and FIG. 16 is a diagram illustrating an example of a basic functional configuration of the photometric apparatus 100D according to the fifth embodiment. The schematic configuration and function of the photometric apparatus 100D according to the fifth embodiment is different from the first embodiment in that the photometric apparatus 100D further includes a tilt angle display portion 60 displaying a tilt angle, and the measurement control portion 30 is replaced by a measurement control portion 30D that can control the tilt angle display portion 60, as illustrated in FIGS. 15 and 16. The other configuration and the function are similar to those of the photometric apparatus 100 according to the first embodiment.

Specifically, as illustrated in FIG. 16, a common unit 40D in the photometric apparatus 100D includes the measurement control portion 30D and the tilt angle display portion 60, in addition to the tilt sensor portion 10 and the photosensor portion 20. A liquid crystal display forming the tilt angle display portion 60 is desirably a reflective type as in the measurement result display portion 50, considering measurement accuracy by the photosensor portion 20.

In the photometric apparatus 100D, the tilt angle display portion 60 can be mounted to the photometric apparatus 100 according to the first embodiment, and further, can be mounted to the photometric apparatus 100A according to the second embodiment or to the photometric apparatus 100B according to the third embodiment. When the tilt angle display portion 60 is applied to the photometric apparatus 100A, it may be provided to either one of the tilt sensor unit 40A1 or the photosensor unit 40A2. When the tilt angle display portion 60 is applied to the photometric apparatus 100B, it may also be provided to either one of the tilt sensor unit 40B 1 or the photosensor unit 40B2. In addition, the function of the tilt angle display portion 60 can be added to the measurement result display portion 50 according to the fourth embodiment.

<5-1. Display Example of Tilt Angle Display Portion 60>

Figure 17:
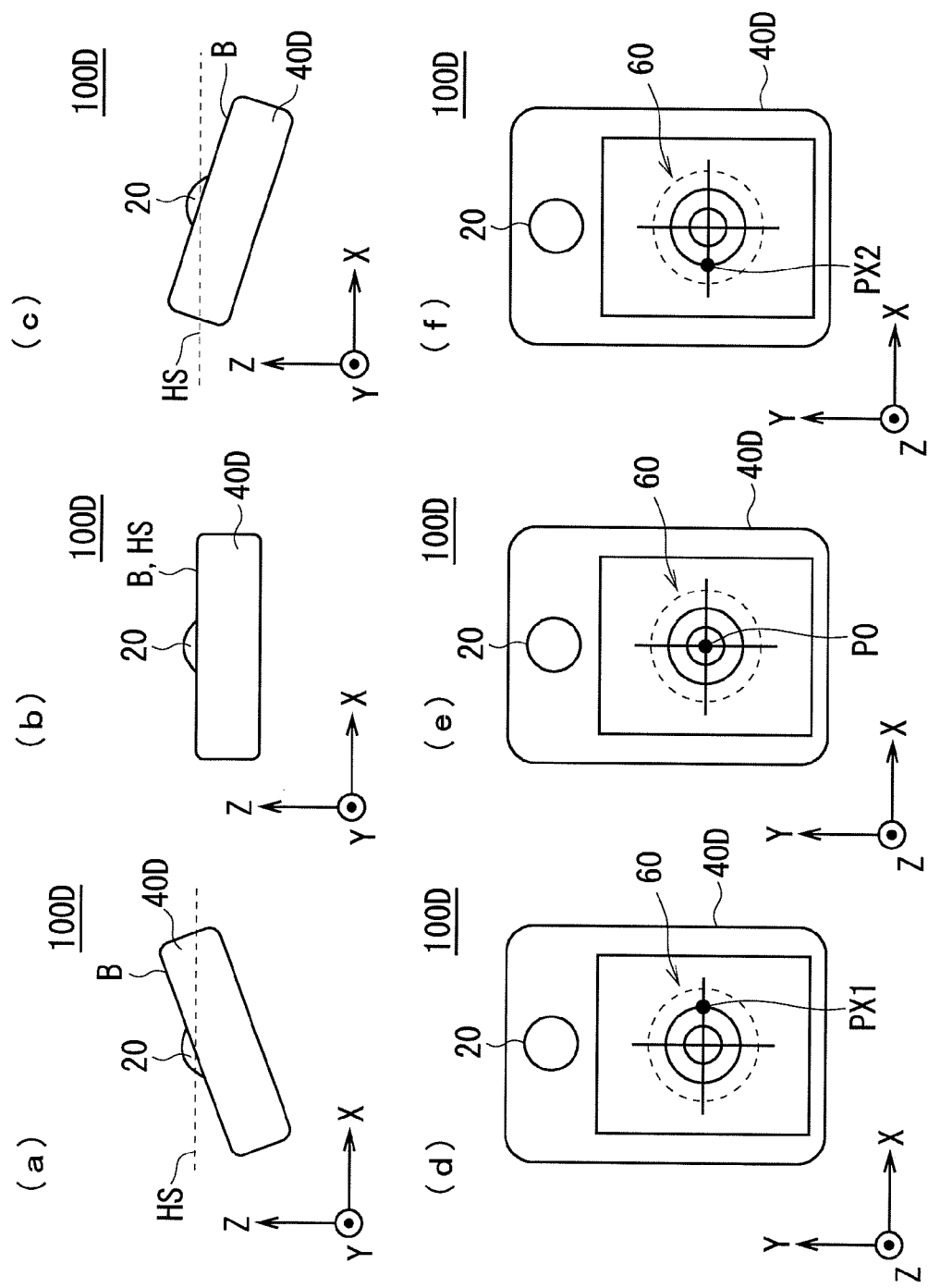
FIG. 17 is a view for describing a display example of a tilt angle display portion 60.
Figure 18:
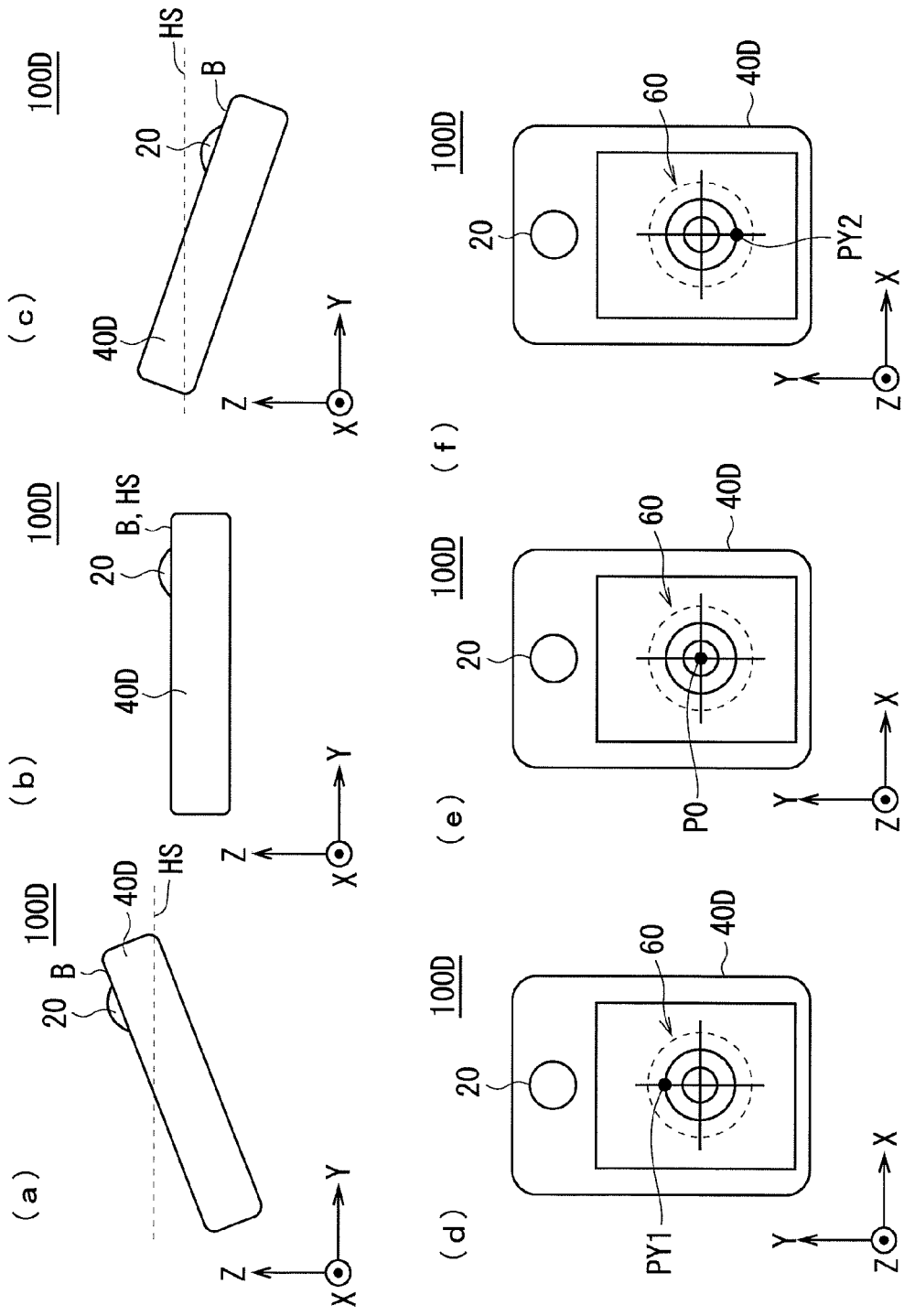
FIG. 18 is a view for describing a display example of the tilt angle display portion 60.

Next, display examples of the tilt angle display portion 60 in the photometric apparatus 100D will be described. FIGS. 17 and 18 are views for describing display examples of the tilt angle display portion 60. Parts (a) to (c) of FIG. 17 are views when the XZ plane of the photometric apparatus 100D is viewed from +Y direction, and parts (d) to (f) of FIG. 17 are views corresponding to parts (a) to (c) of FIG. 17 and illustrating display examples of a tilt angle of the photometric apparatus 100D displayed on the tilt angle display portion 60.

As illustrated in FIG. 17, the mounting plane B for the photosensor portion 20 in the photometric apparatus 100D at the side of the +X axis direction tilts in the +Z axis direction with respect to the horizontal surface (XY plane) HS in part (a) of FIG. 17, so that a mark PX1 is displayed on a coordinate corresponding to this situation on the tilt angle display portion 60 in part (d) of FIG. 17. Since the mounting plane B of the photometric apparatus 100D matches the horizontal surface HS in part (b) of FIG. 17, a mark P0 is displayed on a coordinate corresponding to this situation on the tilt angle display portion 60 in part (e) of FIG. 17. Since the mounting plane B for the photosensor portion 20 in the photometric apparatus 100D at the side of the +X axis direction tilts in the −Z axis direction with respect to the horizontal surface HS in part (c) of FIG. 17, a mark PX2 is displayed on a coordinate corresponding to this situation on the tilt angle display portion 60 in part (f) of FIG. 17.

On the other hand, parts (a) to (c) of FIG. 18 are views when the YZ plane of the photometric apparatus 100D is viewed from +X direction, and parts (d) to (f) of FIG. 18 are views corresponding to parts (a) to (c) of FIG. 18 and illustrating display examples of a tilt angle of the photometric apparatus 100D displayed on the tilt angle display portion 60.

As illustrated in FIG. 18, the mounting plane B for the photosensor portion 20 at the side of the +Y axis direction in the photometric apparatus 100D tilts in the +Z axis direction with respect to the horizontal surface HS in part (a) of FIG. 18, so that a mark PY1 is displayed on a coordinate corresponding to this situation on the tilt angle display portion 60 in part (d) of FIG. 18. Since the mounting plane B for the photosensor portion 20 in the photometric apparatus 100D matches the horizontal surface HS in part (b) of FIG. 18, a mark P0 is displayed on a coordinate corresponding to this situation on the tilt angle display portion 60 in part (e) of FIG. 18. Since the mounting plane B for the photosensor portion 20 at the side of the +Y axis direction in the photometric apparatus 100D tilts in the −Z axis direction with respect to the horizontal surface HS in part (c) of FIG. 18, a mark PY2 is displayed on a coordinate corresponding to this situation on the tilt angle display portion 60 in part (f) of FIG. 18.

As described above, in the photometric apparatus 100D according to the fifth embodiment, the user can recognize the tilt angle on the tilt angle display portion 60, whereby operability and workability are enhanced.

6. Sixth Embodiment

Figure 19:
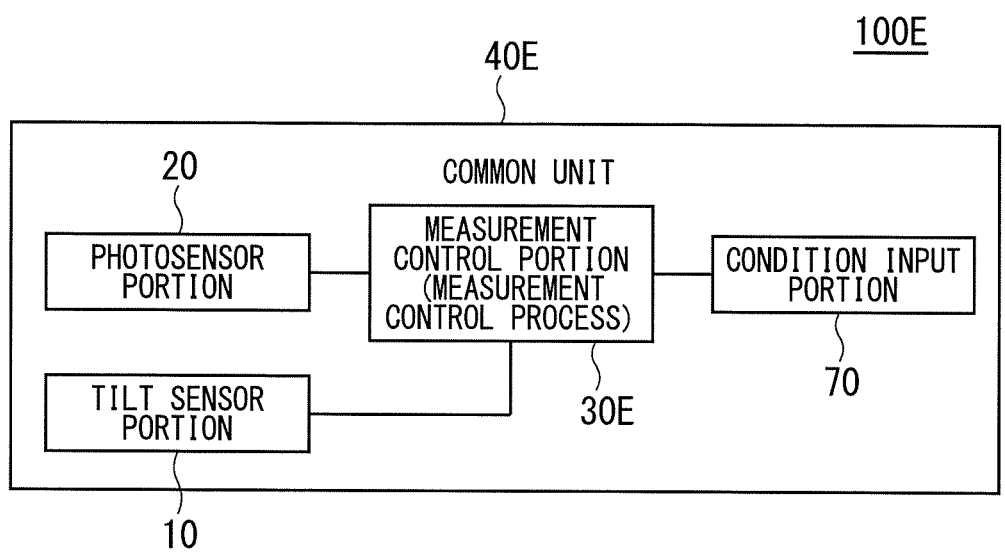
FIG. 19 is a diagram for describing an example of a basic functional configuration of a photometric apparatus 100E according to a sixth embodiment.

FIG. 19 is a diagram illustrating an example of a basic functional configuration of a photometric apparatus 100E according to the sixth embodiment. The schematic configuration and function of the photometric apparatus 100E according to the sixth embodiment is different from the first embodiment in that the photometric apparatus 100E further includes a condition input portion 70 by which the user can set his/her desired set condition (predetermined condition) by an external operation, and the measurement control portion 30 is replaced by a measurement control portion 30E that controls according to the condition inputted to the condition input portion 70, as illustrated in FIG. 19. The other configuration and the function are similar to those of the photometric apparatus 100 according to the first embodiment.

Specifically, as illustrated in FIG. 19, a common unit 40E in the photometric apparatus 100E includes the measurement control portion 30E and the condition input portion 70, in addition to the tilt sensor portion 10 and the photosensor portion 20.

For example, when the user intends to measure horizontal illumination, the user inputs the set condition indicating that the tilt state is 0 degree (horizontal) to the condition input portion 70 via the external operation. With this process, the measurement control portion 30E executes the measurement control process, when the tilt state satisfies the condition indicating that the tilt state is 0 degree. When the user intends to measure vertical illumination, the user inputs the set condition indicating that the tilt state is 90 degree (vertical) to the condition input portion 70 via the external operation. With this process, the measurement control portion 30E executes the measurement control process, when the tilt state satisfies the condition indicating that the tilt state is 90 degree. When the user intends to make measurement at a tilt angle other than the tilt angle for the horizontal illumination or the vertical illumination, the user inputs his/her desired tilt angle by the external operation using the condition input portion 70. With this process, the measurement control portion 30E can execute the measurement control process, when the tilt state satisfies the condition of the tilt angle.

In the photometric apparatus 100E, the condition input portion 70 can be mounted to the photometric apparatus 100 according to the first embodiment, and further, can be mounted to the photometric apparatus 100A according to the second embodiment or to the photometric apparatus 100B according to the third embodiment. When the condition input portion 70 is applied to the photometric apparatus 100A, it may be provided to either one of the tilt sensor unit 40A1 and the photosensor unit 40A2. When the condition input portion 70 is applied to the photometric apparatus 100B, it may also be provided to either one of the tilt sensor unit 40B1 and the photosensor unit 40B2. In addition, it is also considered that the condition input portion 70 is added to the photometric apparatuses 100C and 100D according to the fourth and fifth embodiments.

As described above, in the photometric apparatus 100E according to the sixth embodiment, the user can set any set condition, whereby degree of freedom of the set condition is enhanced.

7. Seventh Embodiment

Figure 20:
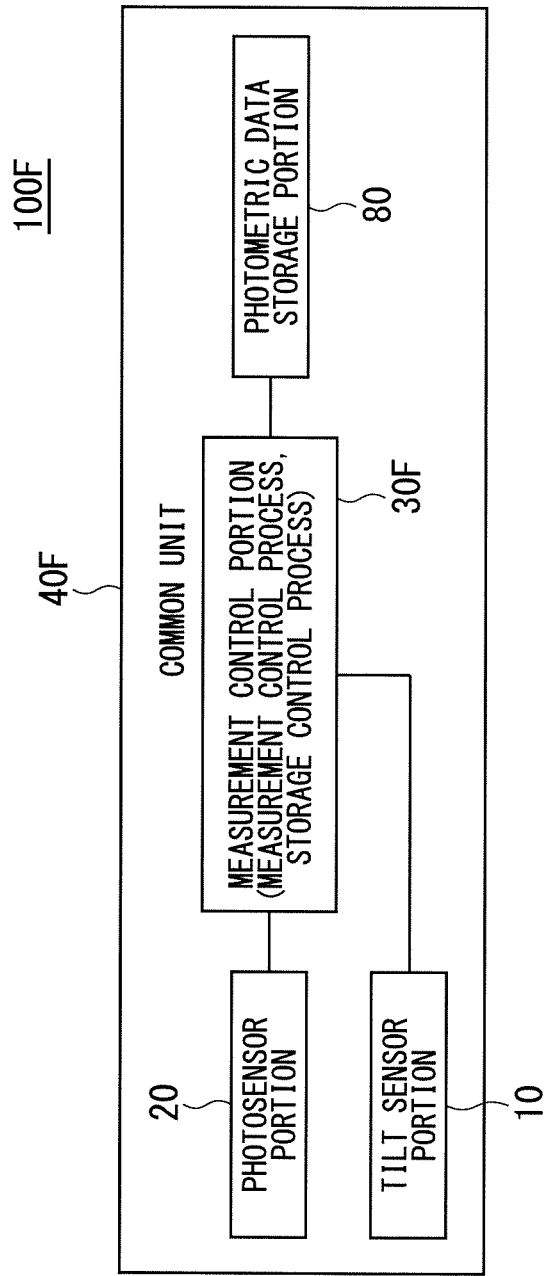
FIG. 20 is a diagram for describing an example of a basic functional configuration of a photometric apparatus 100F according to a seventh embodiment.

FIG. 20 is a diagram illustrating an example of a basic functional configuration of a photometric apparatus 100F according to the seventh embodiment. The schematic configuration and function of the photometric apparatus 100F according to the seventh embodiment is different from the first embodiment in that the photometric apparatus 100F further includes a photometric data storage portion 80 that stores photometric data, and the measurement control portion 30 is replaced by a measurement control portion 30F that controls the photometric data storage portion 80, as illustrated in FIG. 20. The other configuration and the function are similar to those of the photometric apparatus 100 according to the first embodiment.

Specifically, as illustrated in FIG. 20, a common unit 40F in the photometric apparatus 100F includes the measurement control portion 30F and the photometric data storage portion 80, in addition to the tilt sensor portion 10 and the photosensor portion 20. The photosensor portion 20 continuously executes the measuring operation, and the measurement control process also executes a storage control process for allowing the photometric data storage portion 80 to store the photometric data under the situation in which the tilt state satisfies the condition (predetermined condition) set by the user. The effective photometric data means the photometric data stored in the photometric data storage portion 80.

It is preferable that the storage control process by the measurement control portion 30F is a process for allowing the photometric data storage portion 80 to store the photometric data in association with the set condition.

As described above, in the storage control process by the photometric data storage portion 80, a light environment is always measured by the photosensor portion 20, regardless of the set condition. Under the condition (the condition in which the photometric apparatus 100F tilts against the set condition) other than the set condition, the photometric data storage portion 80 does not store this result, and when the tilt state satisfies the set condition, the photometric data storage portion 80 stores the result.

In the photometric apparatus 100F, the photometric data storage portion 80 can be mounted to the photometric apparatus 100 according to the first embodiment, and further, can be mounted to the photometric apparatus 100A according to the second embodiment or to the photometric apparatus 100B according to the third embodiment. When the photometric data storage portion 80 is applied to the photometric apparatus 100A, it may be provided to either one of the tilt sensor unit 40A1 or the photosensor unit 40A2. When the photometric data storage portion 80 is applied to the photometric apparatus 100B, it may also be provided to either one of the tilt sensor unit 40B1 or the photosensor unit 40B2. In addition, it is also considered that the photometric data storage portion 80 is added to the photometric apparatuses 100C to 100E according to the fourth to sixth embodiments.

As described above, in the photometric apparatus 100F according to the seventh embodiment, the measurement control portion 30F executes the measurement control process, thereby suppressing the execution time of the operation of storing the photometric data into the photometric data storage portion 80 to a minimum necessary. Therefore, the photometric data storage portion 80 can efficiently be used, resulting in that power saving of the whole apparatus can be realized.

If the method of storing the photometric data (effective photometric data) into the photometric data storage portion 80 in association with the set condition is employed, the user can read the set condition (e.g., horizontal illumination or vertical illumination) together with the photometric data stored in the photometric data storage portion 80. Accordingly, it becomes unnecessary to separately record the set condition, whereby workability is enhanced.

8. Eighth Embodiment

Figure 21:
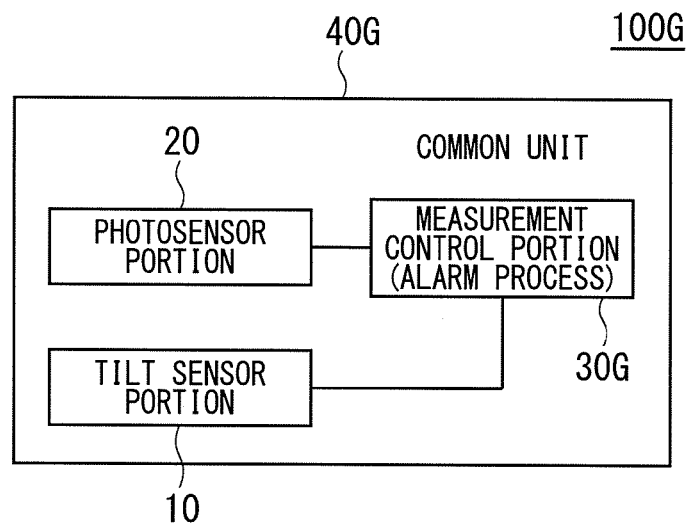
FIG. 21 is a diagram for describing an example of a basic functional configuration of a photometric apparatus 100G according to an eighth embodiment.

FIG. 21 is a diagram illustrating an example of a basic functional configuration of a photometric apparatus 100G according to the eighth embodiment. The schematic configuration and function of the photometric apparatus 100G according to the eighth embodiment is different from the first embodiment in that the measurement control portion 30 is replaced by a measurement control portion 30G that issues an alarm when the tilt angle is outside the predetermined condition, as illustrated in FIG. 21. The other configuration and the function are similar to those of the photometric apparatus 100 according to the first embodiment.

Specifically, a common unit 40G in the photometric apparatus 100G includes the measurement control portion 30G, in addition to the tilt sensor portion 10 and the photosensor portion 20. The measurement control portion 30G determines the tilt state of the photosensor portion 20 based upon the tilt angle, and when the tilt state satisfies the condition set by the user, the measurement control portion 30G allows the photosensor portion 20 to execute the measuring operation. When the tilt state does not satisfy the set condition during the measuring operation, the measurement control portion 30G executes a predetermined alarm process recognizable by the user (see FIG. 21).

Examples of the alarm process recognizable by the user include auditory information such as a buzzer or sound, visual information such as a display of an indicator, a display of a progress bar, a display using numerical values, or a display using a model diagram, on a display screen, and tactile information such as a vibrating motion of the unit.

As to whether or not the alarm process is executed based upon the determination as to whether or not the tilt state satisfies the set condition, the above-mentioned set condition satisfying range (if an error of about 3% is allowed, the set condition falls within a range of ±1 degree, and if an error of about 10% is allowed, the set condition falls within a range of ±3 degree) can be applied as the range where the deviation of the tilt angle is allowed as an error.

As described above, the measurement control portion 30G in the photometric apparatus 100G according to the eighth embodiment executes the predetermined alarm process. Therefore, if the set condition is preliminarily set to the tilt state of the photosensor portion 20 desired by the user, the user can operate the photometric apparatus 100G so as not to receive the alarm process during the measuring operation. Accordingly, the user can relatively easily obtain high accurate photometric data.

In the first to seventh embodiments, whether or not the tilt state satisfies the set condition including the above-mentioned error allowable range may be determined.

<8-1. Modification of Photometric Apparatus 100G>

Figure 22:
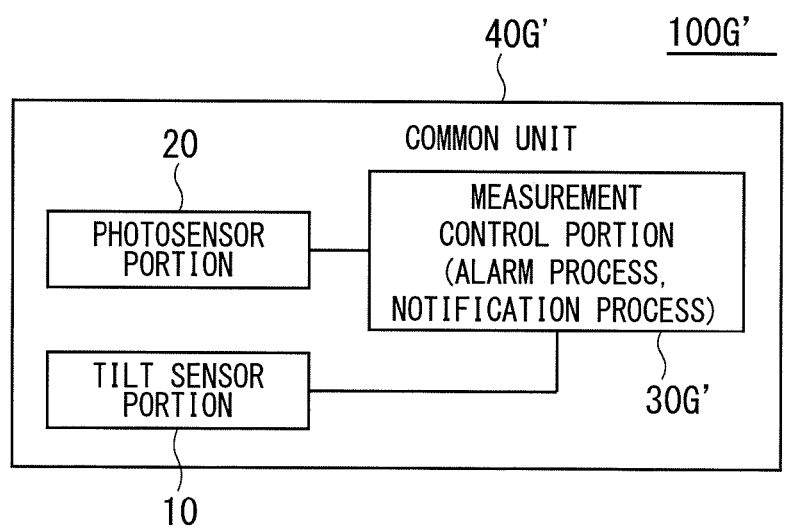
FIG. 22 is a diagram for describing an example of a basic configuration of a modification of the photometric apparatus 100G.

A photometric apparatus 100G' that is a modification of the photometric apparatus 100G according to the eighth embodiment will next be described. FIG. 22 is a diagram for describing an example of a basic functional configuration of the photometric apparatus 100G'. As illustrated in FIG. 22, in the photometric apparatus 100G', the measurement control portion 30G' executes not only the alarm process but also a predetermined notification process recognizable by the user upon the start of the execution of the measuring operation. The other configuration and the function are similar to those of the photometric apparatus 100G according to the eighth embodiment.

Specifically, a common unit 40G' in the photometric apparatus 100G' includes the measurement control portion 30G', in addition to the tilt sensor portion 10 and the photosensor portion 20. The measurement control portion 30G' executes the predetermined notification process recognizable by the user upon the start of the execution of the measuring operation, in addition to the above-mentioned alarm process (see FIG. 22).

The notification process recognizable by the user can be distinguished from the alarm process described above, and examples of the notification process include auditory information such as a sound, visual information such as a display of an indicator, a display of a progress bar, a display using numerical values, or a display using a model diagram, on a display screen, and tactile information such as a vibrating motion of the unit.

As described above, since the measurement control portion 30G' in the photometric apparatus 100G' according to the eighth embodiment executes the predetermined notification process, the user can easily recognize the timing when the photometric apparatus 100G' starts to execute the measuring operation. When the user operates the photometric apparatus 100G' so as not to receive the alarm process after the start of the measuring operation, the user can relatively easily obtain high accurate photometric data.

9. Modification

While the embodiments of the present invention have been described above, the present invention is not limited to the above embodiments, and various modifications are possible.

In the present embodiments, the photometric apparatuses 100, 100A to 100G, and 100G' are separately described in each embodiment such that these photometric apparatuses are individually embodied. However, these individual functions may be combined to one another, so long as they are consistent with one another.

The photosensor unit according to the present embodiments has a function of measuring a target light environment, and can be used in combination with a function (display device, speaker, printer), external transmission function (connection to phone, LAN, and the Internet) of a general-purpose terminal.

The invention claimed is:

1. A photometric apparatus comprising:
a photosensor portion that receives light and performs a measuring operation for acquiring predetermined photometric data relating to the received light;
a tilt sensor portion that detects a tilt angle with respect to a predetermined reference plane; and
a measurement control portion that determines a tilt state of said photosensor portion based upon said tilt angle, and executes a measurement control process for specifying said photometric data acquired by said photosensor portion as effective photometric data, when said tilt state satisfies a predetermined condition.

2. The photometric apparatus according to claim 1, wherein
said photosensor portion and said tilt sensor portion are mounted on a plane parallel to said predetermined reference plane, and
said photometric apparatus includes a common unit having said photosensor portion, said tilt sensor portion, and said measurement control portion.

3. The photometric apparatus according to claim 1, further comprising:
a tilt sensor unit having therein said tilt sensor portion; and
a photosensor unit having therein said photosensor portion, wherein
said tilt sensor unit and said photosensor unit are connected to each other such that said tilt sensor portion and said photosensor portion have a predetermined physical positional relationship.

4. The photometric apparatus according to claim 3, wherein
said tilt sensor portion is mounted on said predetermined reference plane,
said tilt sensor unit further has therein said measurement control portion,
said measurement control portion determines a tilt state of said photosensor portion based upon said tilt angle and said predetermined physical positional relationship recognized beforehand, and
said measurement control portion controls said measuring operation of said photosensor portion.

5. The photometric apparatus according to claim 3, wherein
said tilt sensor portion is mounted on said predetermined reference plane,
a photosensor unit further has therein said measurement control portion,
said measurement control portion can acquire information of said tilt angle, and
said measurement control portion determines a tilt state of said photosensor portion based upon said tilt angle and said predetermined physical positional relationship recognized beforehand.

6. The photometric apparatus according to claim 1, further comprising:
a measurement result display portion that displays said photometric data.

7. The photometric apparatus according to claim 6, wherein
said photosensor portion continuously executes said measuring operation,
said measurement control process includes a process of allowing said measurement result display portion to display said photometric data in the case where said tilt state satisfies said predetermined condition, and
said effective photometric data includes said photometric data displayed on said measurement result display portion after said tilt state satisfies said predetermined condition.

8. The photometric apparatus according to claim 1, further comprising:
a tilt angle display portion that displays said tilt angle.

9. The photometric apparatus according to claim 1, further comprising:
a condition input portion that can set said predetermined condition by an external operation.

10. The photometric apparatus according to claim 1, wherein
said measurement control process includes a process of allowing said photosensor portion to execute said measuring operation, when said tilt state satisfies said predetermined condition, and
said effective photometric data includes said photometric data.

11. The photometric apparatus according to claim 1, further comprising:
a photometric data storage portion that stores said photometric data, wherein
said photosensor portion continuously executes said measuring operation,
said measurement control process includes a storage control process of allowing said photometric data storage portion to store said photometric data in the case where said tilt state satisfies said predetermined condition, and
said effective photometric data includes said photometric data stored in said photometric data storage portion.

12. The photometric apparatus according to claim 11, wherein
said storage control process includes a process of allowing said photometric data storage portion to store said photometric data in association with said predetermined condition.

13. A measurement control program in a photometric apparatus including a photosensor portion that receives light and performs a measuring operation for acquiring predetermined photometric data relating to the received light; and a tilt sensor portion that detects a tilt angle with respect to a predetermined reference plane, said measurement control program comprising the steps of:
(a) determining a tilt state of said photosensor portion based upon said tilt angle;
(b) determining whether said tilt state determined in said step (a) satisfies said predetermined condition or not; and
(c) determining said photometric data acquired by said photosensor portion as effective photometric data, when said tilt state satisfies said predetermined condition in said step (b).

14. The measurement control program according to claim 13, wherein
said photometric apparatus includes a tilt sensor unit having therein said tilt sensor portion mounted on said predetermined reference plane, and a photosensor unit having therein said photosensor portion, said tilt sensor unit and said photosensor unit being connected to each other such that said tilt sensor portion and said photosensor portion have a predetermined physical positional relationship, said steps (a) to (c) are executed in one of said tilt sensor unit and said photosensor unit, and said step (a) includes the steps of:

(a-1) recognizing said predetermined physical positional relationship; and (a-2) determining the tilt state of said photosensor portion based upon said tilt angle and said predetermined physical positional relationship.

15. A photometric apparatus comprising:

a photosensor portion that receives light and performs a measuring operation for acquiring predetermined photometric data relating to the received light;

a tilt sensor portion that detects a tilt angle with respect to a predetermined reference plane;

a measurement control portion that executes a predetermined alarm process recognizable by a user, when a tilt state of said photosensor portion, determined based upon said tilt angle, does not satisfy a predetermined condition.

16. The photometric apparatus according to claim 15, further comprising:

a tilt sensor unit having therein said tilt sensor portion; and a photosensor unit having therein said photosensor portion, wherein said tilt sensor unit and said photosensor unit are connected to each other such that said tilt sensor portion and said photosensor portion have a predetermined physical positional relationship.

17. The photometric apparatus according to claim 15, wherein said measurement control portion executes a predetermined notification process recognizable by a user upon a start of executing said measuring operation.

* * * * *